United States Patent [19]

Moran et al.

[11] 3,970,763
[45] July 20, 1976

[54] HEAT PASTEURIZED CAKE BATTER

[75] Inventors: David Patrick Joseph Moran, Potters Bar, England; Henricus Jacobus Pennings, Oud Beyerland, Netherlands

[73] Assignee: Lever Brothers Company, New York, N.Y.

[22] Filed: Apr. 9, 1974

[21] Appl. No.: 459,502

[30] Foreign Application Priority Data
Apr. 11, 1973 United Kingdom............... 17293/73

[52] U.S. Cl. ............................. 426/324; 426/568; 426/498; 426/553; 426/558; 426/576; 426/521; 426/399
[51] Int. Cl.².......................................... A21D 2/00
[58] Field of Search ........... 426/343, 345, 363, 399, 426/128, 152, 154, 155, 157, 159, 496, 498, 549, 552, 613, 558, 564, 568, 312, 316, 458, 521, 551, 654, 329, 327, 321, 324, 325, 326, 573–578, 553, 556

[56] References Cited
UNITED STATES PATENTS

| | | | |
|---|---|---|---|
| 2,716,606 | 8/1955 | Patterson | 426/568 |
| 2,768,082 | 10/1956 | Crossland | 426/345 |
| 3,803,326 | 4/1974 | Craig | 426/549 |
| R25,231 | 8/1962 | Finucane | 426/128 |

*Primary Examiner*—Norman Yudkoff
*Assistant Examiner*—Hiram H. Bernstein
*Attorney, Agent, or Firm*—James J. Farrell; Melvin H. Kurtz; Kenneth F. Dusyn

[57] ABSTRACT

Cake batter is prepared by mixing separate aqueous and fat phases previously heat-treated, the aqueous phase being first aerated mechanically. The batter is packaged and can be stored at refrigerator temperatures for considerable periods without deterioration.

15 Claims, 1 Drawing Figure

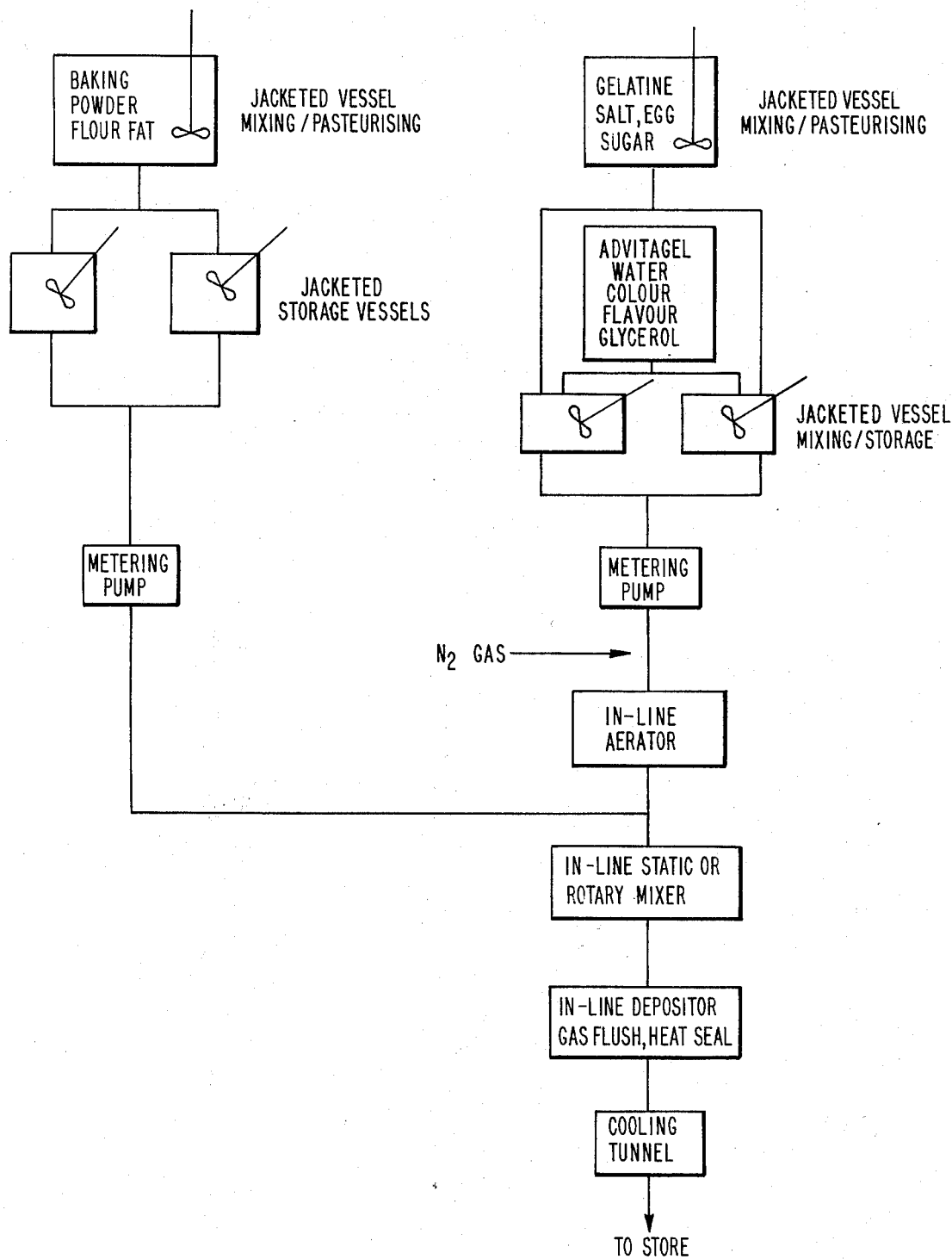

HEAT PASTEURIZED CAKE BATTER

This invention relates to ready-to-use bakery compositions and in particular relates to wet cake mixes, i.e. containing all the basic ingredients necessary for making cakes, including whole egg, i.e. egg with its liquid component.

When Victoria sandwich and similar types of cake are baked from a mixture including the basic ingredients comprising whole eggs, fat, sugar, and flour, this is usually prepared immediately before baking. The ingredients are mixed either all together in a single stage as in the "all-in-one" recipe, or the fat and sugar are creamed together and the flour and eggs added subsequently.

In either case the mix is prepared immediately before baking. This may often be inconvenient but the mix is highly susceptible to bacterial infection. It also undergoes physical and possibly chemical changes on standing which result in an inferior cake with a poor crumb structure.

The present invention provides a ready-to-use cake mix containing all the basic ingredients including whole egg, which can be kept for several weeks at refrigerator temperatures without spoiling and which on baking as required gives a cake of excellent quality. According to the present invention therefore a method of preparing a complete cake mix comprises (a) mixing and pasteurising the fat and flour ingredients at a temperature, for example between 70° and 100°C, at which degradation of the flour is avoided and cooling the mixture, (b) pasteurising a mixture of the egg and sugar components at a temperature, not substantially in excess of about 70°C, at which the egg protein remains undenatured, cooling and aerating the mixture thus produced with nitrogen or other suitable gas in the presence of a small amount of a stiffening agent and, if desired, of an emulsifier effective at the air/water interface to produce a foam, (c) mixing the foam with the cooled fat-flour mixture, and (d) packaging the cake mix thus produced in sealed containers under aseptic conditions, preferably in air which is filtered to remove particles greater than a few microns in size.

By means of the invention the convenience of ready prepared cake mixes is combined with the advantage of formulations for a cake mix which includes whole egg as a component, since the mixes may be stored at domestic refrigerator temperatures for several weeks without marked loss of quality.

The drawing is a schematic representation of a flow chart depicting how cake batter of the present invention is produced.

In combining the ingredients of the mix in accordance with the invention, conventional proportions of the principal ingredients may be used. The pound cake recipe, based on substantially equal quantities by weight of the principal ingredients fat, flour, sugar and eggs, may be adopted in the present invention, but variations may be made in the proportions of the ingredients, according to the nature of the cake required.

Glycerol is preferably included in the egg mixture according to the invention for the purpose of augmenting the effect of the sugar in suppressing the water activity of the mixture to a value of at most 0.85. The effect of the sugar also raises the temperature at which the egg mixture can be pasteurised without being denatured. A minor amount of glycerol is used, preferably from 1–10% by wt of the total cake mix. Other admissible agents may be used instead, in similar quantities, for example polyethylene glycols, for the same purpose. With some recipes sufficient sugar may be present to dispense with the need for auxiliary water-suppressing agents.

Additional ingredients may be used in the recipe, but care must be taken to ensure that the final composition is sufficiently pasteurised. In particular it is advantageous to include a small amount, for example from 1–5% by wt of the flour, of baking powder, to improve the eating qualities of cakes baked from the mixture by assisting in the aeration of the batter. The baking powder, or at least its bicarbonate component, should be included with the flour in step (a) of the process, to ensure that it reacts only when all the ingredients are brought together. A small amount of leavening capacity may be lost in the pasteurisation process. Other ingredients, for example flavouring and colouring matter, may be added in minor amounts according to preference. These may be added also in step (c) of the process of the invention and should first be pasteurised.

The stiffening agent is preferably gelatin, but alternative materials, for example edible gums including caragheenan, guar and locust bean gum, alginates and similar materials may be used. The amount required should be sufficient to stiffen the aerated mix without inhibiting its formation and yet not materially impair the cooking properties of the cake. The mix may be at least partially set before being packaged, setting usually being completed during storage. In the case of gelatin from 0.2–1% by wt of the total mix to be whipped is usually sufficient, but the precise amount may require experiment to determine. Too much will generally produce a cake of low volume/weight ratio. Similar amounts of alternative stiffening agents are usually adequate, but it may be necessary to find the exact amount by simple experiment. Sufficient stiffening agent should be added to provide the stiffening action required to set the composition and thus maintain it in its aerated condition until required for baking, without conferring a noticeable undesirable texture to the product.

The aeration is preferably carried out by means of a mechanical mixer in conjunction with a supply of filtered sterilised nitrogen gas which is sparged into the agitated mix. An overrun of about 500% is adequate but it may be varied from about 300% upwards, according to the volume characteristics required in the cake product.

The emulsifying agent effective in the egg mix to provide the necessary overrun, is preferably present in an amount from 0.1–10%, and more preferably from 0.5–2% by weight of the total mix. A preferred emulsifier for this purpose is a hydrated monoglyceride, for example that sold under the registered trade mark "Advitagel." Other air/water emulsifiers may also be used. The amount of emulsifier has an influence on the cell size and texture of the final cake. During mixing the temperature of the "Advitagel" should preferably not exceed 30°C.

The fat ingredient may be a conventional shortening formulation and for this purpose animal or hardened vegetable oils are appropriate, for example hardened soyabean oil, hardened groundnut oil or hardened sunflowerseed oil are all suitable ingredients for the fat. Fish oils which have been hardened may also be used and, in general, fats and oils which have been found to be suitable as shortenings are applicable to the invention. Preferably however a more liquid glyceride oil, e.g. a vegetable oil, is used since it provides a soft crumb texture on the baked product. Palm oleine is particularly preferred.

Additional ingredients, for example fruit and nuts or seeds may be incorporated in the compositions of the invention, but care must be taken to ensure that they are sterilised.

In preparing the compositions of the invention, the fat is stirred at a carefully controlled temperature a few degrees below 100°C, preferably in the region of 95°C. Higher temperatures and different times can however be used. Stirring is continued for 10 mins. while the flour is progressively added in a controlled stream to avoid any tendency for the flour to form clumps in the fat. Stirring is continued after the addition is completed, including any baking powder required in the composition and the mixture is cooled to a temperature of about 30°–50°C to keep the fat in a liquid condition for addition to the remaining ingredients.

The egg composition is prepared at a somewhat lower temperature at which the ingredients nevertheless undergo pasteurisation. A temperature in the region of 70°C, maintained for from 5–20 mins., is sufficient for this purpose. The sugar, any glycerol and egg components are heated together and agitated to dissolve the sugar and pasteurise the mixture, which is then cooled to about 30°C. It is a characteristic of such emulsifiers as "Advitagel" that they exhibit mesomorphic forms temperatures, which only one form, stable at these comparatively low tempeatures, is effective at the air/liquid interface to make a foam. After the addition of the emulsifier the mixture is agitated to a substantial overrun. It may be possible by the use of other suitable emulsifiers for this purpose to modify the cooling step before agitation takes place, but generally the temperature at which aeration is carried out is from 20°–30°C.

An important preferred feature of the invention is the provision of the packing step in which the product is packed in hermetically sealed containers. These are first flushed with a mixture of nitrogen and carbon dioxide, the latter being present in the mixture in a minor amount by volume, preferably 10–15 vol. %, to exercise an action preventing the growth of moulds. Low residual oxygen concentration retards yeast growth in addition to minimising oxidative deterioration. Preferably also the packing equipment is operated in an atmosphere of filtered air as described, to minimise the ingress of air-borne microorganisms.

Suitable containers may be prepared from aluminium foil on which the batter may be baked directly.

The packed containers may be stored for several weeks at 5°C and the contents then baked to yield excellent cake.

EXAMPLE 1

11.5 kilograms of fresh eggs were vigorously stirred and heated to 70°C in a jacketted vessel during the addition of a mixture of 11.9 kilograms of sugar and 250 grams of gelatin. After remaining at 70°C for about 15 mins., the egg phase was cooled to about 25–30°C.

A pre-mix containing emulsifier was then prepared, to facilitate its dispersion in the egg phase without excessive heating. The pre-mix consisted of 1.95 kilograms of water and 1.46 kilograms of glycerol, pasteurised at 70°C and then cooled to 30°C, when flavouring and colouring materials were added, together with 0.95 wt % "Advitagel" by weight of the total batter, thoroughly distributed in the pre-mix using a Silverson stirrer at slow speed which was previously sterilised. The pre-mix was then added with stirring to the cooled egg phase and the whole mix further cooled to about 22°C.

150 grams of baking powder and 12 kilograms of flour were mixed together as dried powders and added with stirring to 10.4 kilograms palm oleine heated to 70°C in a jacketted vessel. The temperature in the vessel was then increased to 95°C and held there for 5 mins., before cooling the mixture to about 24°C.

The egg phase was then aerated by passing through an Oakes' mixer to a specific volume of about 4.8, the temperature of the egg phase being maintained at 22°C and nitrogen pressure at 60 psig and throughput 1 cu.ft./hr.

The nitrogenated egg phase was then blended with the fat phase in a ratio giving a specific volume for the complete batter of about 3, the ratio being about 6 parts egg phase to 4½ parts fat phase.

The batter was deposited into foil containers under clean air conditions, the air being previously filtered to remove particles more than a micron in size, the foil headspace was flushed with nitrogen containing about 60% carbon dioxide and less than 2% residual oxygen, and then hermetically sealed at about atmospheric pressure.

The batter both before and after storage in a domestic refrigerator for three weeks produced excellent quality cake on baking at 350°F (Regulo 4) for about half-an-hour. Similar results were obtained when to the batter about half its weight of pasteurised sultanas or mixed fruit were added. Alternatively the fruit could be mixed with the oil/flour blend and pasteurised as described.

It will be understood that the cake mixes with which the invention is concerned may include substitutes for fresh eggs which are similarly susceptible in their whole form, due to their aqueous liquid content, to denaturation on heating. As with compositions based on fresh eggs, the process of the invention minimises the extent to which this undesirable change takes place in these egg substitutes.

EXAMPLE 2

A series of trials was carried out on different emulsifiers, using in each case an otherwise similar procedure and recipe, which was as follows, parts being percentages by weight:

| Aqueous phase | | Table Margarine Fat phase | |
|---|---|---|---|
| Sugar | 20 | Fat | 20 |
| Sorbitol powder | 6.5 | Wheat Starch | 4 |
| Salt | 0.4 | Wheat flour | 20 |
| Gelatine | 1.1 | | |
| Whole fresh eggs | 23 | | |
| Water | 3–4 | | |

In addition the following emulsifier systems were used:

| | |
|---|---|
| Trial 1 — Advitagel | 1.85 wt % |
| Trial 2 — BV40 | 1.5 |
| Trial 3 — PGMS 1 <br> PGPO 2 | 1.0 |
| Trial 4 — MGPO | 1.0 |

-continued

| | |
|---|---|
| Trial 5 — Admul 1407 | 1.0 |

BV40 = Spray-dried sodium caseinate composition ex Meyery NV
Admul 1407 = Polyglycerol ester of long chain fatty acids
MGPO = Monoglyceride of hardened palm oil
PGMS = Propylene glycol monostearate
Advitagel = A mixture of PGMS and MGPO in gel form with water stabilised in alpha-phase with sorbitol.

After heat treatment as described in Example 1, the aqueous phase ingredients were creamed as before, with nitrogen injection, at 35°C for 2½ to 6 mins., and after mixing with the fat/flour phase at 25°C, packaged at 32°.

Samples were then baked as before and the density (mls/gm) before and after baking was measured. In all cases the structure of the cake was good. The densities were as follows:

Trial 1 — Unbaked 1.92, baked 3.5
Trial 2 — Unbaked 1.72, baked 3.3
Trial 3 — Unbaked 1.66, baked 3.2
Trial 4 — Unbaked 1.56, baked 3.0
Trial 5 — Unbaked 1.7, baked 3.3.

The quality of the products remained excellent as indicated by baking and testing the cake for colour and density after storage at 20°C for periods of at least 6 weeks. In all cases the cake samples were of excellent eating quality.

We claim:

1. A process for the preparation of a ready-to-bake cake batter having egg, sugar, flour and fat ingredients in conventional proportions comprising:
   a. heat-pasteurising an aqueous phase containing the egg in the presence of sufficient sugar to inhibit denaturing the egg by the heat-pasteurising treatment;
   b. heat-pasteurising a fat phase containing both the fat and flour by melting the fat and admixing a stream of the flour therewith while maintaining said fat phase at a temperature which is sufficiently high to pasteurise the flour but below the degradation temperature of the flour;
   c. aerating the pasteurised aqueous phase with an inert gas at a temperature at which an overrun is induced, to produce a foamed aqueous phase in the presence of a sufficient amount of an edible stiffening agent to stiffen the batter;
   d. cooling and blending the fat phase and the foamed aqueous phase together with any remaining ingredients, at a temperature at which the overrun of the aqueous phase is preserved and in proportions of ingredients so as to provide a maximum water activity of 0.85; and
   e. packaging the cake mix produced in sealed containers under aseptic conditions.

2. Process according to claim 1 in which the aqueous phase is heated to a temperature not in substantial excess of 75°C.

3. Process according to claim 1 in which the fat phase is heated to a temperature from 70° to 120°C.

4. Process according to claim 3 in which the fat phase is heated to a temperature from 70° to 100°C.

5. Process according to claim 1 in which the water activity of the aqueous phase is at most 0.85.

6. Process according to claim 5 in which a small amount of a polyhydric alcohol is included in the water phase to suppress water activity.

7. Process according to claim 6 in which the polyhydric alcohol comprises glycerol.

8. Process according to claim 1 in which a small amount of a chemical leavening agent is distributed between the phases to augment aeration of the mix.

9. Process according to claim 1 in which a small amount of an edible emulsifier is included in the aqueous phase which is effective to promote foam formation.

10. Process according to claim 9 in which from 0.1 to 10% of emulsifier, by weight of the aqueous phase, is included.

11. Process according to claim 10 in which the emulsifier comprises a monoglyceride of a long chain fatty acid.

12. Process according to claim 1 in which the aqueous phase is aerated by sparging with an inert gas.

13. Process according to claim 1 in which aeration is effected at a temperature from 20° to 30°C.

14. Process according to claim 1 in which the heated fat phase is cooled to a temperature from 30° to 50°C, at which the fat remains liquid before mixing with the aqueous phase.

15. A process for the preparation of cake batters consisting essentially of an aerated blend of egg, sugar, flour and shortening fat ingredients in substantially equal proportions, comprising the steps of:
   a. heating the sugar and egg ingredients together, to a temperature not in excess of about 70°C for a period from about 5 to about 20 minutes whereby a pasteurised undenatured aqueous phase is produced;
   b. aseptically cooling the aqueous phase to a temperature from about 20°C to about 30°C;
   c. aerating the aqueous phase to an overrun of at least 300% by gas injection with an inert gas in the presence of:
      1. about 0.5 to about 2% of an emulsifier effective to produce a foam, wherein said emulsifier is a partial glyceride of a long chain fatty acid, and
      2. about 0.2 to about 1% of an edible gelling agent effective to stiffen the foam, said gelling agent selected from the group consisting of caragheenan, guar and locust bean gums;
   d. melting the shortening fat and mixing the flour therein by heating the fat phase produced to a temperature from about 70° to about 120°C for a period of about 5 minutes sufficient to destroy vegetative bacteria;
   e. aseptically cooling the fat phase to a temperature from about 30° to about 50°C, at which the fat remains melted;
   f. mixing the fat phase with the aqueous phase to provide a cake batter having a maximum water activity of 0.85; and
   g. packaging and sealing the cake batter under aseptic conditions.

* * * * *